United States Patent
Hatzav et al.

(10) Patent No.: US 7,948,665 B2
(45) Date of Patent: May 24, 2011

(54) UNIFORM ILLUMINATION FOR CAMERA BASED SCANNING DEVICES

(75) Inventors: Iuval Hatzav, Los Angeles, CA (US); Daniel Hatzav, Hod Hasharon (IL); Ilan Ben-Shahar, Beer-Sheva (IL); Giyora Sharaby, Moshav Neve Yarak (IL)

(73) Assignee: CSSN, Inc

( * ) Notice: Subject to any disclaimer, the term of this patent is extended or adjusted under 35 U.S.C. 154(b) by 752 days.

(21) Appl. No.: 11/685,235

(22) Filed: Mar. 13, 2007

(65) Prior Publication Data

US 2008/0285094 A1    Nov. 20, 2008

Related U.S. Application Data

(63) Continuation-in-part of application No. 11/552,989, filed on Oct. 26, 2006, now Pat. No. 7,821,679, and a continuation-in-part of application No. 11/552,321, filed on Oct. 24, 2006, and a continuation-in-part of application No. 10/959,261, filed on Oct. 6, 2004, now Pat. No. 7,911,655.

(60) Provisional application No. 60/881,512, filed on Jan. 22, 2007.

(51) Int. Cl.
*H04N 1/04* (2006.01)

(52) U.S. Cl. ........ 358/475; 358/474; 358/482; 358/906; 382/181; 362/257; 235/375; 399/130

(58) Field of Classification Search .................. 358/474, 358/501, 483, 482, 497, 496, 51–2, 540, 358/1.152; 382/181, 313, 107; 362/257; 235/375; 399/130

See application file for complete search history.

(56) References Cited

U.S. PATENT DOCUMENTS

| | | | | |
|---|---|---|---|---|
| 5,293,242 A * | 3/1994 | Mamiya | ......................... | 348/362 |
| 5,572,251 A * | 11/1996 | Ogawa | ..................... | 348/207.99 |
| 6,002,421 A * | 12/1999 | Russell et al. | ................. | 347/250 |
| 6,096,510 A * | 8/2000 | Hochman | ........................ | 435/29 |
| 6,532,092 B2 * | 3/2003 | Neushul | ..................... | 359/211.2 |
| 6,603,352 B2 * | 8/2003 | Wight | ............................ | 330/251 |
| 6,785,405 B2 * | 8/2004 | Tuttle et al. | .................... | 382/112 |
| 6,834,238 B1 * | 12/2004 | Hochman | ........................ | 702/21 |
| 7,342,692 B2 * | 3/2008 | Chang | ............................ | 358/483 |
| 7,364,077 B2 * | 4/2008 | Wolf, II | ......................... | 235/454 |
| 7,532,369 B2 * | 5/2009 | Huang et al. | ................... | 358/474 |
| 2004/0012825 A1 * | 1/2004 | Tesavis | ........................ | 358/474 |

* cited by examiner

*Primary Examiner* — Negussie Worku

(57) ABSTRACT

A system for imaging a document including an imaging apparatus, which includes a camera positioned inside the imaging apparatus, the camera configured to acquire a plurality of images of a document in front of the camera. The document is place behind a glass window on a wall opposing the camera. The imaging apparatus includes an illumination system which is positioned around the glass window but outside the field of view (FOV) of the camera. The imaging apparatus further includes an opaque cover, which covers the whole glass window area. The cover includes a slit to insert a document to be imaged, a slit to remove the document and a groove that enables a user to move the document with his finger.

16 Claims, 5 Drawing Sheets

UNIFORM ILLUMINATION FOR CAMERA BASED SCANNING DEVICES

CROSS REFERENCE TO RELATED APPLICATIONS

This application claims the benefit under 35 USC 119(e) from U.S. provisional application 60/881,512 filed Jan. 22, 2007, the disclosure of which is included herein by reference.

This application is a continuationinpart of application Ser. No. 10/959,261, filed Oct. 6, 2004 now U.S. Pat. No. 7,911,655, which is incorporated by reference in its entirety herein.

This application is also a continuationinpart of application Ser. No. 11/552,321, filed Oct. 24, 2006, which is incorporated by reference in its entirety herein.

This application is also a continuationinpart of application Ser. No. 11/552,989, filed Oct. 26, 2006 now U.S. Pat. No. 7,821,679, which is incorporated by reference in its entirety herein.

The disclosures of the above continuationinpart applications are incorporated herein by reference.

This application is related to the following U.S. patent applications:

"System and method for scanning a business card from within ms outlook directly into the ms outlook contact file", application Ser. No. 11/307,943 filed Feb. 28, 2006; and "System and method for creating a visitor badge for a conference or exhibition from a scanned ID or smart card document," application No. 60/763,455 filed Jan. 31, 2006.

The disclosures of the above relate applications are incorporated herein by reference.

FIELD OF THE INVENTION

The present invention relates to illumination systems and methods for cameras, and more particularly to illumination systems and methods for scanning devices for scanning a business card, an ID card, a passport and the like documents, providing an illumination which is substantially uniform.

BACKGROUND OF THE INVENTION

There exist in today's market scanning devices capable of reading ID cards, drivers license, business cards and the like. Scanning devices which include imaging sensors based on technologies such as a CCD or CMOS, require illumination of the scanned document.

Illumination coming from external sources such as room illumination often creates uncontrolled reflections on the scanned document, thereby distorting the image of the scanned document. Internal light sources may also bring about problems of reflections that distort the uniformity of the illumination of the scanned document, thereby causing the image of the scanned document not to be a substantially true image of the scanned document.

Reference is made to FIGS. 1a (Prior art) and 1b (Prior art). FIG. 1b depicts a hot spot 40 caused by direct illumination of the scanned document 10 or by illumination from external source entering the scanned from bare areas of the scanner glass window, and FIG. 1a illustrates how hot spots 40 are formed by direct illumination of the scanned document 10 or glass window 20 in front of the scanned document. When imaging a document 10 with a camera 50, document 10 needs to be illuminated. In conventional illumination method, as shown in FIG. 1a, illumination positions 31 and 32 enable the return of the majority of light to the lens of camera 50, but give rise to a problem known in the art as hot spot 40, where the light source (30) itself is imaged by camera 50.

Thus there is a need for and it would be advantageous to have a camera based scanner that has an illumination system that provides uniform illumination with no reflections, hot spot effects, and other illumination artifacts.

SUMMARY OF THE INVENTION

In view of the limitations now presented in the prior art, the present invention provides a new and useful system that can enhance the quality of scanned documents.

BRIEF DESCRIPTION OF THE DRAWINGS

The present invention will become fully understood from the detailed description given herein below and the accompanying drawings, which are generally not drawn to scale and are given by way of illustration only and thus, not limitative of the present invention, and wherein.

DETAILED DESCRIPTION OF THE INVENTION

Figure 1A:
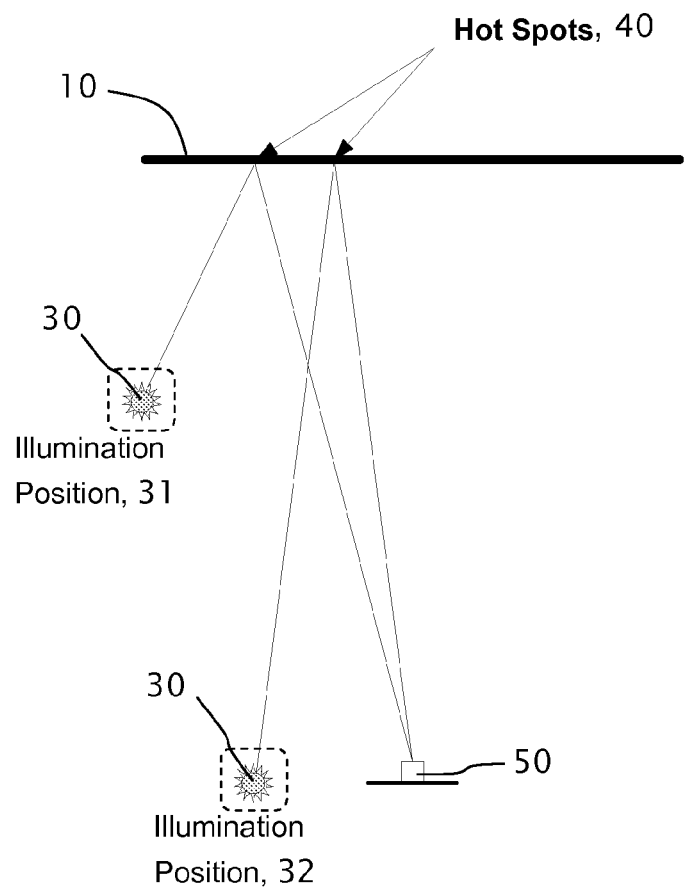
FIG. 1a (Prior art) illustrates the hot spot problem caused by direct illumination of the scanned document or external light sources.
Figure 1B:
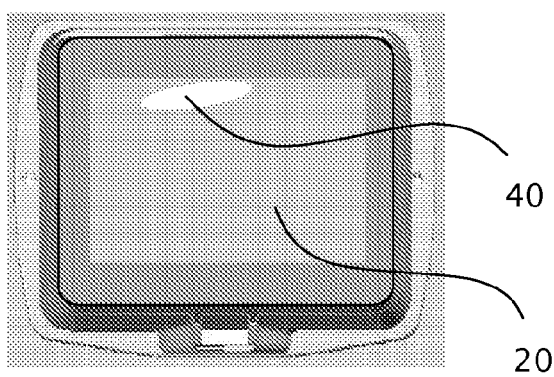
FIG. 1b (Prior art) depicts a hot spot caused by direct illumination of the scanned document and clear window in front of the scanned document.

The present invention is an improved scanner for scanning business cards, ID cards, passports and the like documents, having illumination which is substantially uniform. The scanner includes a camera and at least one light source such as a LED light source (herein after referred to as LED), the light source being disposed outside the camera field of view (FOV). The scanner also includes a fixed cover that prevents internal light from being transmitted outside the optical chamber of the scanner, and more importantly, prevents external light from entering the optical chamber of the scanner and possibly distorting the uniformity of the illumination.

Before explaining embodiments of the invention in detail, it is to be understood that the invention is not limited in its application to the details of construction and the arrangement of the components set forth in the host description or illustrated in the drawings.

Unless otherwise defined, all technical and scientific terms used herein have the same meaning as commonly understood by one of ordinary skill in the art of the invention belongs. The methods and examples provided herein are illustrative only and not intended to be limiting.

Figure 2:
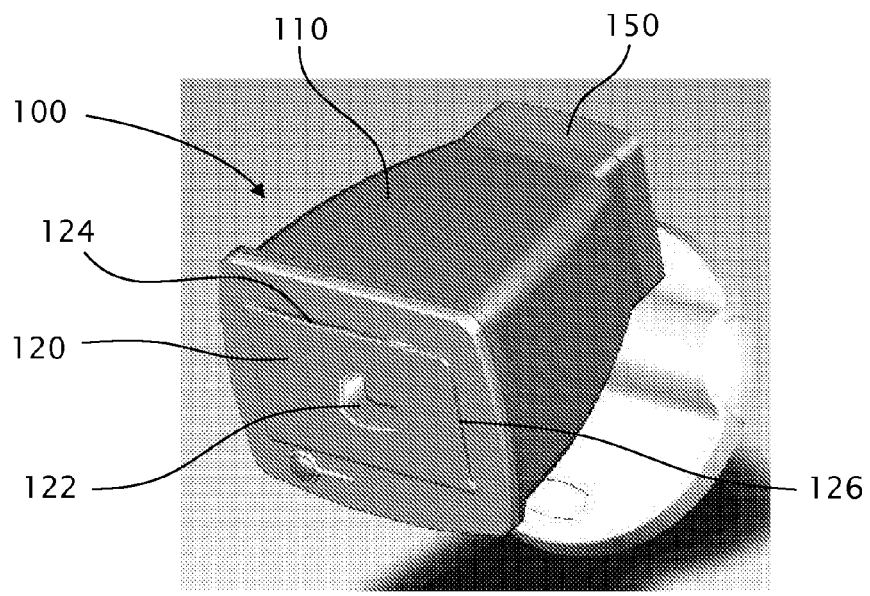
FIG. 2 depicts a perspective view of the scanner with uniform illumination, according with embodiments of the present invention, as seen from outside the scanner.

FIG. 2 depicts a perspective view of a scanner 100 with uniform illumination, according with embodiments of the present invention, as seen from outside scanner 100. Scanner 100 includes the body 110 enclosing the scanner optical chamber, camera chamber 150 containing camera unit 50 and a fixed cover 120.

Figure 3:
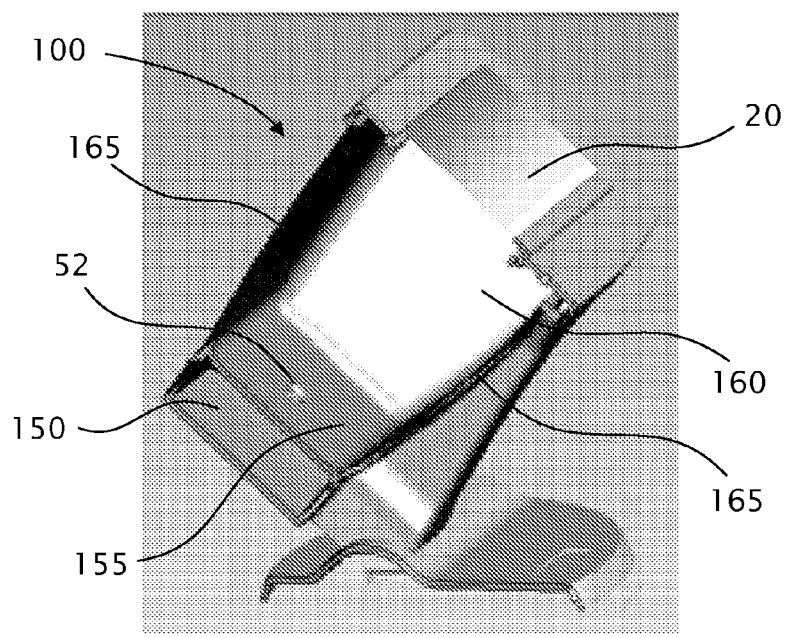
FIG. 3 depicts a perspective view of a cross section of the scanner with uniform illumination, according with embodiments of the present invention.

FIG. 3 depicts a perspective view of a cross section of scanner 100 with uniform illumination, according with embodiments of the present invention. The cross section cuts out the top wall of scanner 100. Scanner 100 includes camera chamber 150 located at the back of scanner 100 and containing camera unit 50. The camera lens ocular 52 is viewing the scanner optical chamber 160, which is enclosed on its opposite side by a window 20, which is a transparent window such as of glass, hard clear plastic or the like, hereinafter referred to as "window" or "glass window". Document 10 is to place behind glass window 20, and camera 50 is focused on the document plan.

Figure 4:
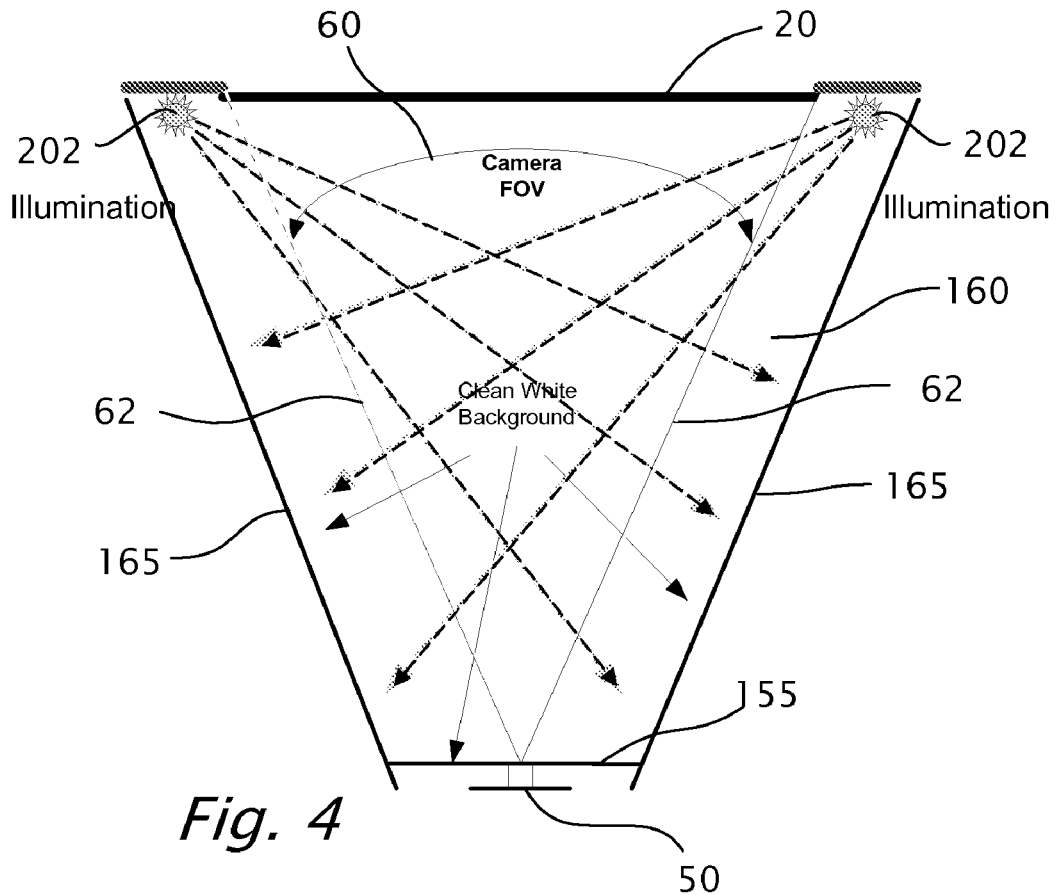
FIG. 4 illustrates a lighting configuration, according with the preferred embodiment of the present invention, providing uniform illumination.

FIG. 4 illustrates a lighting configuration, according with the preferred embodiment of the present invention, providing uniform illumination. In this embodiment, one or more light sources 202 are directed towards reflecting walls 155 and 165 which form optical chamber 160, whereas all the rays that bounce off walls 155 and 165 create a uniform white illumination inside optical chamber 160, which illuminates glass window 20 and thereby document 10 with no reflections, hot spot effects, and other illumination artifacts. One or more light sources 202 are positioned such that they are out of the field of view (FOV) 60 of camera 50, the FOV outlined by lines 62 between which camera 50 can "see". Limiting the FOV such that camera 50 cannot "see" light sources 202 prevents hot spots from being formed on glass window 20 and thereby on document 10.

Figure 5:
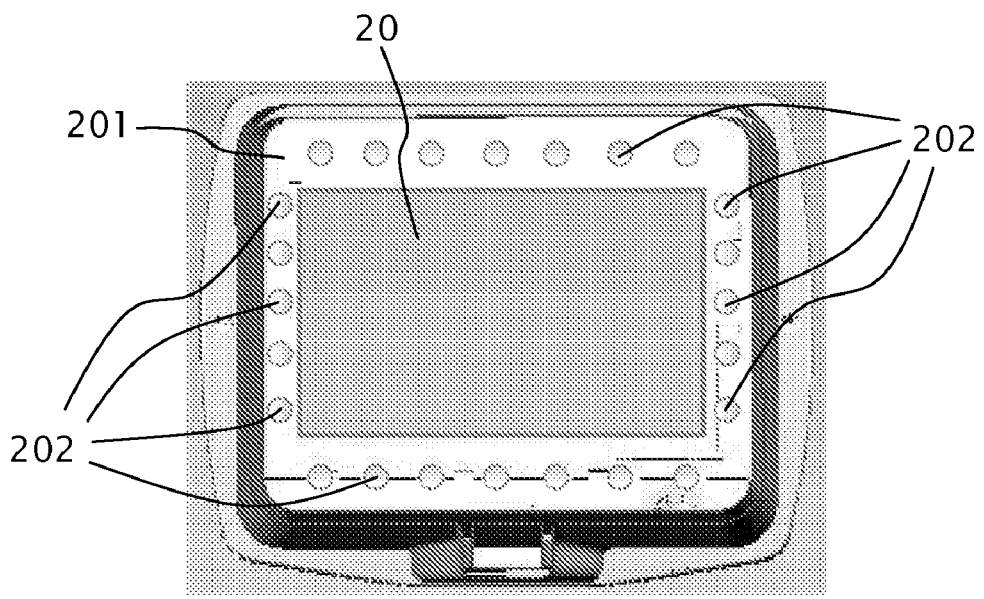
FIG. 5 depicts an example lighting configuration of the scanner with uniform illumination, according with the preferred embodiment of the present invention, as viewed from the camera point of view.

FIG. 5 depicts an example lighting configuration 201 of a scanner 100 with uniform illumination, according with the preferred embodiment of the present invention, and as viewed from the camera point of view. In this example, lighting configuration 201 includes four (4) rows of LED light sources 202 disposed around glass window 20. Since camera 50 can view only glass window 20, light sources 202 do not form hot spots on glass window 20 and thereby on the image of document 10.

Light sources 202 may comprise IR illumination, UV illumination, visible light illumination and other bands of wave length as required, to process colored documents, documents with special backgrounds such as water marks and any other visible and invisible printed materials used. Scanner 100 is controlled by a processor which also controls light sources 202. The processor may select the light source type and control the light source intensity, by using Pulse Width Modulation (PWM), for example.

For the sake of clarity, light sources 202 may be any type of light source, but scanner 100 of the present invention preferably uses LED light sources 202, including IR, UV and visible light LED light sources.

Scanner 100 also includes a fixed cover 120 that prevents external light from entering optical chamber 160 and possibly distorting the uniformity of the generated illumination. Fixed cover 120 also prevents internal light from being transmitted outside optical chamber 160 of the scanner 100.

Figure 6:
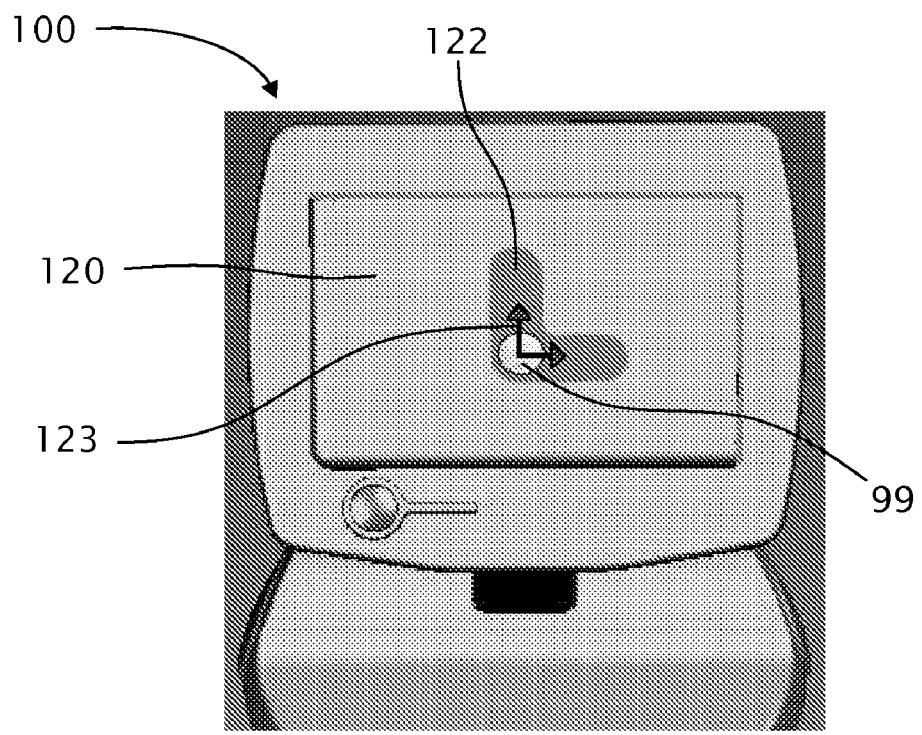
FIG. 6 depicts a front view illustration of the preferred embodiment of the cover of a scanner with uniform illumination, according with embodiments of the present invention.
Figure 7:
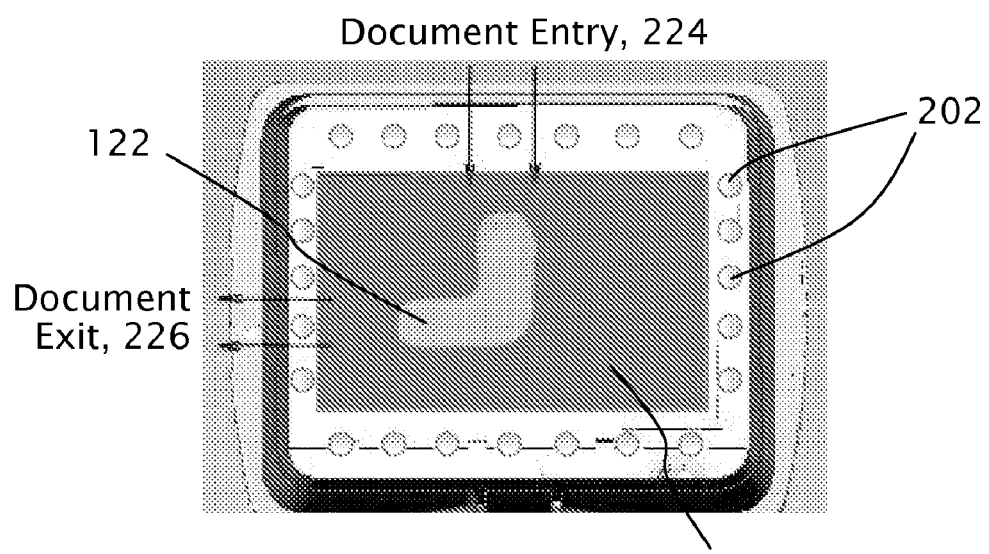
FIG. 7 depicts the preferred embodiment of the cover of a scanner with uniform illumination, according with embodiments of the present invention, as viewed through the window, from the camera point of view.

FIG. 6 is a front view illustration of the preferred embodiment of fixed cover 120, according with embodiments of the present invention, and FIG. 7 depicts cover 120 of scanner 100 as viewed through window 20, from the camera point of view, inside optical chamber 160. Referring also to FIG. 2, fixed cover 120 covers glass window 20. Cover 120 includes an opaque plate with a mechanism to allow the insertion of a document 10 to be scanned, and the removing of document 10 after being scanned.

In the preferred embodiment of the present invention, the mechanism that allows the insertion, moving and removing of document 10, includes:
 a) a slit 124 to insert document 10;
 b) a slit 126 to remove document 10; and
 c) a groove 122.
 Groove 122 enables a user to move document 10 in the groove directions 123, using, for example, the user's finger 99 or the eraser side of a pencil 99 or means the like that fit inside groove 122. When document 10 is inserted and being scanned, document 10 itself blocks light from entering or leaving optical chamber 160 through groove 122.

Figure 8:
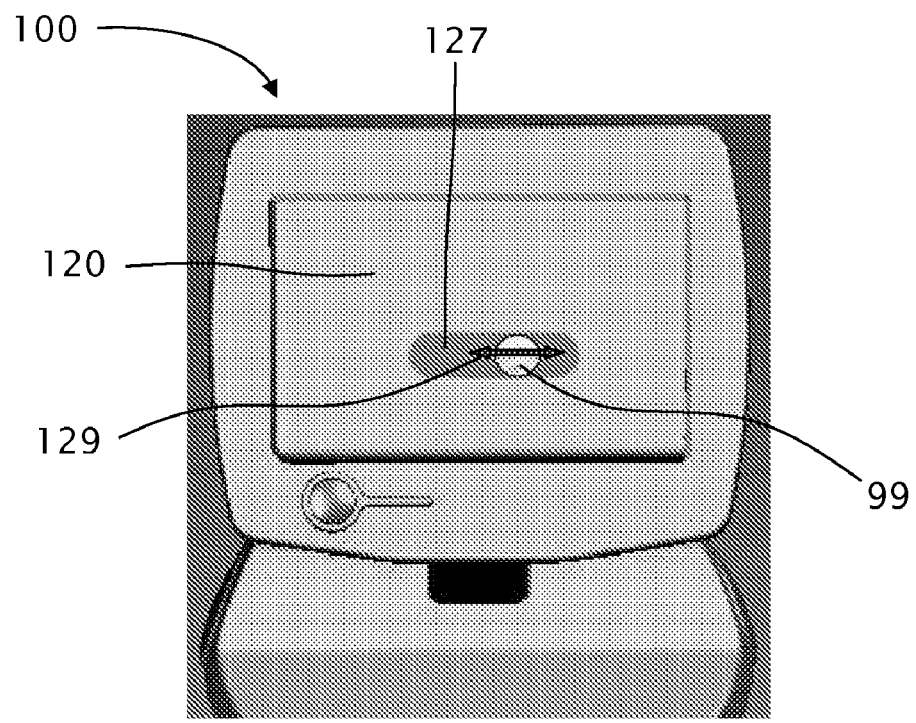
FIG. 8 is a front view illustration of an embodiment of a cover of a scanner with uniform illumination, according with embodiments of the present invention.

FIG. 8 is a front view illustration of another embodiment of a document moving mechanism for a cover 120 of scanner 100, according with embodiments of the present invention. The mechanism which allows the insertion, moving and removing of document 10, includes:
 a) a slit 124 to insert document 10;
 b) a slit 126 to remove document 10; and
 c) a groove 127.
 Document 10 is inserted into slit 124 and dropped down by the force of gravity. Groove 127 enables a user to move document 10 in the groove directions 129, using, for example, the user's finger 99 or the eraser side of a pencil 99 or means the like that fit inside groove 127. When document 10 is inserted and being scanned, document 10 itself blocks light from entering or leaving optical chamber 160 through groove 127.

Figure 9:
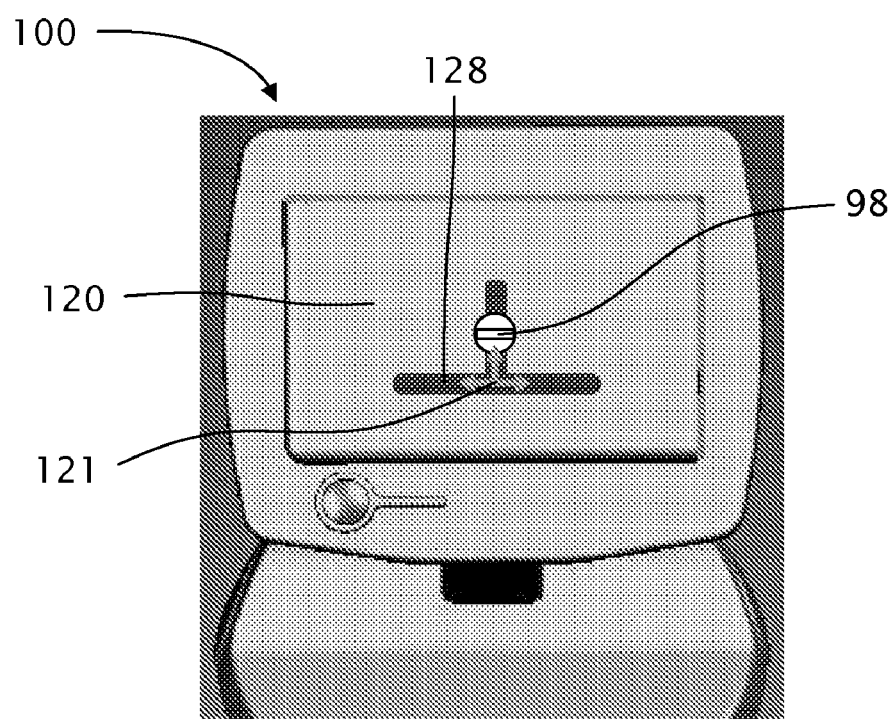
FIG. 9 is a front view illustration of an embodiment of a cover of a scanner with uniform illumination, according with embodiments of the present invention.

FIG. 9 is a front view illustration of another embodiment of a document moving mechanism for a cover 120 of scanner 100, according with embodiments of the present invention. The mechanism which allows the insertion, moving and removing of document 10, includes:
 a) a slit 124 to insert document 10;
 b) a slit 126 to remove document 10; and
 c) a groove 128.
 Groove 128 enables a user to move document 10 in the groove directions 121, using a moving mechanism, for example, a pin 98, which, for example can be in idle situation pushed back by a force such as a spring. When needing to move document 10, the pin is pushed against document 10 move while the pushing pressure is kept on. Pin 98 may include a high friction, elastic element on pin 98 internal end, such as a rubber element to balance the pressure on document 10 and improve the control of moving document 10. When document 10 is inserted and being scanned, document 10 itself blocks light from entering or leaving optical chamber 160 through groove 128.

It should be note that grooves in all embodiments can be extended such the document 10 can be removed from both or either side of fixed cover 120, and slit 126 is disposed on both or appropriate side of cover 120, respectively with the groove horizontal positioning.

It should be note that grooves in all embodiments can be extended such the document 10 can be removed automatically by connecting the pin 98 to an electric motor/magnetic coils or pneumatic means.

Florescence image of the document may be acquired by illuminating the document with excitation light in UV, NUV or blue wavelength and acquiring data from the green and red sensitive pixels of a color sensitive sensor array. An optical filter designed to block the excitation wavelength may be used to protect the sensor.

Although the present invention has been described with reference to the preferred embodiment and examples thereof, it will be understood that the invention is not limited to the details thereof. Various substitutions and modifications have suggested in the foregoing description, and other will occur to those of ordinary skill in the art. Therefore, all such substitutions and modifications are intended to be embraced within the scope of the invention as defined in the following claims.

What is claimed is:

1. An imaging apparatus used in conjunction with a processor in a camera system for imaging a document, the imaging apparatus comprising:
   (a) a camera, having a lens-ocular with a predetermined field of view (FOV), said camera configured to acquire a plurality of image frames of at least a portion of the document;
   (b) a camera-chamber, wherein said camera is disposed inside said camera-chamber;
   (c) an enclosed optical-chamber;
   (d) a camera-wall having a camera-face, an optical-face and an ocular-opening formed in said camera-wall at a preconfigured location, said camera-wall being a mutual wall of said optical-chamber and said camera-chamber, wherein said lens-ocular fits inside said ocular-opening, and wherein said optical-face faces said optical-chamber;
   (e) a window-wall positioned opposite to said camera-wall, said window-wall having an internal face and an external face, wherein the document is operatively disposed adjacent to said external face;
   (f) a substantially transparent window integrated into said window-wall, wherein said transparent window is viewed by said FOV of said lens-ocular; and
   (g) at least one light source configured to operatively illuminate the document,
   wherein said at least one light source is disposed inside said optical-chamber but outside said FOV of said lens-ocular, thereby said at least one light source cannot directly illuminate said lens-ocular of said camera.

2. The imaging apparatus of claim 1, wherein the document is an identity document.

3. The imaging apparatus of claim 1, wherein said at least one light source is disposed on said internal face of said window-wall, distal from said transparent window, thereby said at least one light source cannot directly illuminate the document.

4. The imaging apparatus of claim 1, wherein said at least one light source is an infra red light source, an ultra violate light source or a fluorescence image.

5. The imaging apparatus of claim 1, wherein said at least one light source is a LED light source.

6. The imaging apparatus of claim 1, wherein said at least one light source includes a light diffuser for even illumination of the document.

7. The imaging apparatus of claim 1, wherein said at least one light source includes a light diffuser which is a light reflector.

8. The imaging apparatus of claim 1, wherein said at least one light source includes a light diffuser being is a light reflector and including a light baffle for preventing direct illumination of the document by said light source.

9. The imaging apparatus of claim 1, wherein all walls of said optical chamber are opaque, except for said transparent window.

10. The imaging apparatus of claim 1, wherein the document is operatively disposed adjacent to said transparent window, on said external face of said window-wall.

11. The imaging apparatus of claim 1, wherein the imaging apparatus further comprising:
    (h) an opaque cover, said cover covering at least said transparent window area.

12. The imaging apparatus of claim 11, wherein said cover is securely attached to said external face of said-window wall and forms a gap between said transparent window and said cover, said cover comprising:
    (a) a slit formed at the top part section of said cover for inserting the document;
    (b) a slit formed on at least one side of said cover to facilitate removal of the document; and
    (c) a document moving mechanism for moving the document disposed in said gap formed between said transparent window and said cover.

13. The imaging apparatus of claim 12, wherein said document moving mechanism is a groove formed in said cover, and wherein the document can be moved by a user's finger or by an article, inserted through said groove.

14. The imaging apparatus of claim 13, wherein said groove is formed in said cover such that when the document is imaged by said camera, the documents blocks light from being transmitted in and out of the imaging apparatus, through said groove.

15. The imaging apparatus of claim 1, wherein said at least one light source of said illumination system is operable to emit visible light.

16. The imaging apparatus of claim 15, wherein said optical-face of said camera-wall is substantially white, thereby illumination diffused from said optical-face of said camera-wall is substantially white.

* * * * *